(12) United States Patent
Vecziedins et al.

(10) Patent No.: US 7,883,619 B2
(45) Date of Patent: Feb. 8, 2011

(54) WATER TREATMENT SYSTEM WITH MOISTURE DETECTOR

(75) Inventors: Karlis Vecziedins, Caledonia, MI (US); Joshua K. Schwannecke, Portland, MI (US); Michael E. Miles, Grand Rapids, MI (US); William T. Stoner, Jr., Ada, MI (US); Clinton H. Throop, Saranac, MI (US)

(73) Assignee: Access Business Group International LLC, Ada, MI (US)

( * ) Notice: Subject to any disclaimer, the term of this patent is extended or adjusted under 35 U.S.C. 154(b) by 715 days.

(21) Appl. No.: 11/939,160

(22) Filed: Nov. 13, 2007

(65) Prior Publication Data

US 2009/0120851 A1    May 14, 2009

(51) Int. Cl.
*B01D 35/00* (2006.01)
*B01J 19/12* (2006.01)
*H05B 37/00* (2006.01)

(52) U.S. Cl. .............. 210/85; 210/87; 210/94; 210/143; 315/307; 422/186.3

(58) Field of Classification Search .......... 210/748.1, 210/748.11, 85, 87, 94, 143
See application file for complete search history.

(56) References Cited

U.S. PATENT DOCUMENTS

| | | | |
|---|---|---|---|
| 4,562,725 A * | 1/1986 | Oka et al. ............... 73/29.05 |
| 4,635,027 A * | 1/1987 | Miyoshi et al. ............ 338/34 |
| 4,902,411 A | 2/1990 | Lin |
| 4,915,816 A * | 4/1990 | Shakkottai et al. ......... 204/430 |
| 4,971,687 A | 11/1990 | Anderson |
| 5,384,032 A | 1/1995 | de Souza |
| 5,540,848 A | 7/1996 | Engelhard |
| 5,597,482 A | 1/1997 | Melyon |
| 5,698,091 A | 12/1997 | Kuennen et al. |
| 5,935,431 A | 8/1999 | Korin |
| 6,042,720 A | 3/2000 | Reber et al. |
| 6,099,735 A | 8/2000 | Kelada |
| 6,099,799 A | 8/2000 | Anderson |
| 6,120,691 A | 9/2000 | Mancil |
| 6,139,726 A * | 10/2000 | Greene ..................... 210/94 |
| 6,436,299 B1 | 8/2002 | Baarman et al. |
| 6,469,308 B1 | 10/2002 | Reed |
| 6,773,608 B1 | 8/2004 | Hallett et al. |
| 6,830,697 B1 * | 12/2004 | Pearcey ................. 210/198.1 |

(Continued)

FOREIGN PATENT DOCUMENTS

GB        2271106        4/1994

(Continued)

*Primary Examiner*—Duane Smith
*Assistant Examiner*—Paul J Durand
(74) *Attorney, Agent, or Firm*—Warner Norcross & Judd LLP

(57) ABSTRACT

A water treatment system including a UV bulb, a moisture detector, and a control circuit responsive to the moisture detector to terminate power to the bulb when moisture is detected. The moisture detector includes a nonconductive substrate and a pair of conductors on the substrate. When moisture is not present, the detector is nonconductive. However, when moisture accumulates on the detector, the moisture provides a conductive path between the conductors so that the detector becomes conductive. When moisture is detected, the control circuit terminates power to the bulb and/or provides an appropriate indication to the system user.

16 Claims, 8 Drawing Sheets

U.S. PATENT DOCUMENTS

| | | |
|---|---|---|
| 6,972,415 B2 * | 12/2005 | Schaible et al. ............ 250/436 |
| 7,005,074 B2 | 2/2006 | Nguyen et al. |
| 2003/0178356 A1 | 9/2003 | Bartkus et al. |
| 2003/0205509 A1 | 11/2003 | Barnes et al. |
| 2003/0213755 A1 | 11/2003 | Hanbli |
| 2004/0108280 A1 | 6/2004 | Saraceno |
| 2004/0232079 A1 | 11/2004 | Taylor et al. |
| 2005/0000911 A1 | 1/2005 | Thorpe |
| 2005/0156119 A1 | 7/2005 | Greene |
| 2005/0205480 A1 | 9/2005 | Kuhlmann et al. |
| 2005/0279679 A1 | 12/2005 | Baarman |
| 2005/0279689 A1 | 12/2005 | Oranski et al. |
| 2006/0021926 A1 | 2/2006 | Woodard et al. |
| 2006/0231476 A1 | 10/2006 | Vandenbelt et al. |

FOREIGN PATENT DOCUMENTS

| | | |
|---|---|---|
| JP | 63156589 | 6/1988 |
| JP | 63163157 | 7/1988 |
| JP | 63194794 | 8/1988 |
| JP | 03052686 | 3/1991 |
| JP | 07024450 | 1/1995 |
| JP | 09057253 | 3/1997 |
| JP | 11262760 | 9/1999 |
| JP | 11313874 | 11/1999 |
| JP | 2002181755 | 6/2002 |
| WO | 9519553 | 7/1995 |
| WO | 0078366 | 12/2000 |
| WO | 0196823 | 12/2001 |
| WO | 2006061241 | 6/2006 |

* cited by examiner

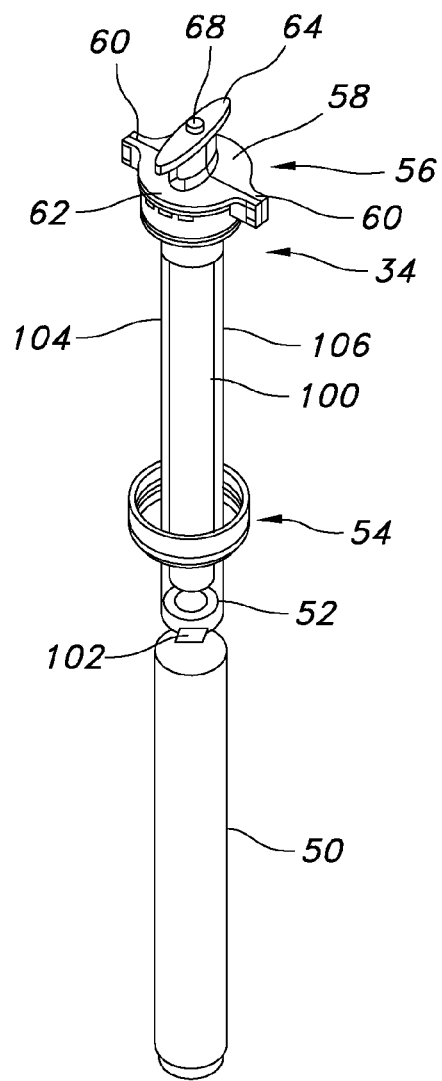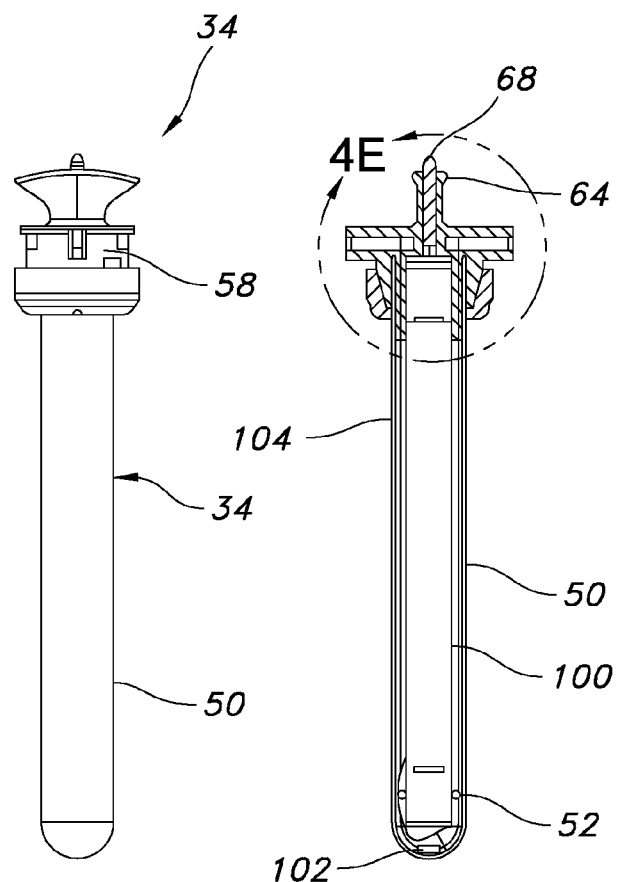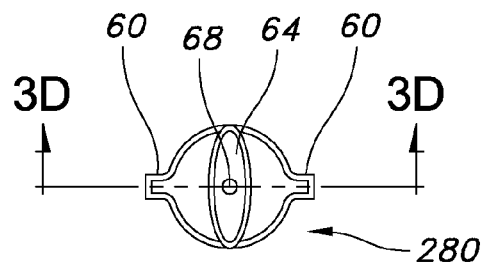
FIG. 3A
FIG. 3B
FIG. 3D
FIG. 3C

WATER TREATMENT SYSTEM WITH MOISTURE DETECTOR

BACKGROUND OF THE INVENTION

The present invention relates to water treatment systems, and more particularly to electrically powered water treatment systems.

Many systems utilize running water. The water may be used many ways, ranging from cooling the system to providing cleaner water.

Water treatment systems (WTS) are well know and widely used throughout the world. A particularly efficacious point-of-use WTS is disclosed in U.S. Pat. No. 7,166,216 to Woodard et al and entitled "Point-of-Use Water Treatment System." Among other functions, such a system kills bacteria and viruses in the water by exposing the water to ultraviolet (UV) light as the water flows through the system. A UV bulb is housed within a protective transparent sleeve. Water flows around the protective sleeve to bring the water into close physical proximity to the UV bulb within the sleeve to enhance the "kill rate."

Occasionally, the integrity of the protective sleeve can be compromised, and water can enter the sleeve, for example if the sleeve is broken or if a seal fails. In such a situation, the efficacy of the system can be reduced; the UV bulb may break if contacted by the water; and electrical power problems can arise. However, users of the system sometimes are unaware that water has penetrated the sleeve, because the sleeve is not visible within the assembled system. Indeed, the UV treatment area typically is shrouded to avoid UV light exposure to human eyes. While prior artisans have included a light sensors to detect extinguishment of the UV light (e.g. because of bulb breakage or power interruption), users continue to be unaware of water penetration into the sleeve that does not result in bulb extinguishment, but in which the system may not be operating at maximum efficacy.

SUMMARY OF THE INVENTION

The aforementioned problems are overcome by the present invention comprising a water treatment system (WTS) having a light source, a sleeve separating the water from the light source, and a moisture detector within the sleeve, and a control circuit responsive to the moisture detector.

Although the present invention is disclosed within the context of a WTS, the moisture detector and the control circuit have applicability in a wide variety of lighting applications in which the detection of moisture in inappropriate or undesired locations is desired.

The invention provides an effective, simple, and efficient approach for detecting moisture and for taking action in response to that detection.

These and other objects, advantages, and features of the invention will be more fully understood and appreciated by reference to the description of the current embodiment and the drawings.

BRIEF DESCRIPTION OF THE DRAWINGS

FIG. 3A is an exploded perspective view of the lamp assembly.

FIG. 3B is an elevational view of the lamp assembly.

FIG. 3C is a top plan view of the lamp assembly.

FIG. 3D is a sectional view of the lamp assembly taken along line 3D-3D of FIG. 3C.

DESCRIPTION OF THE CURRENT EMBODIMENT

Figure 1:
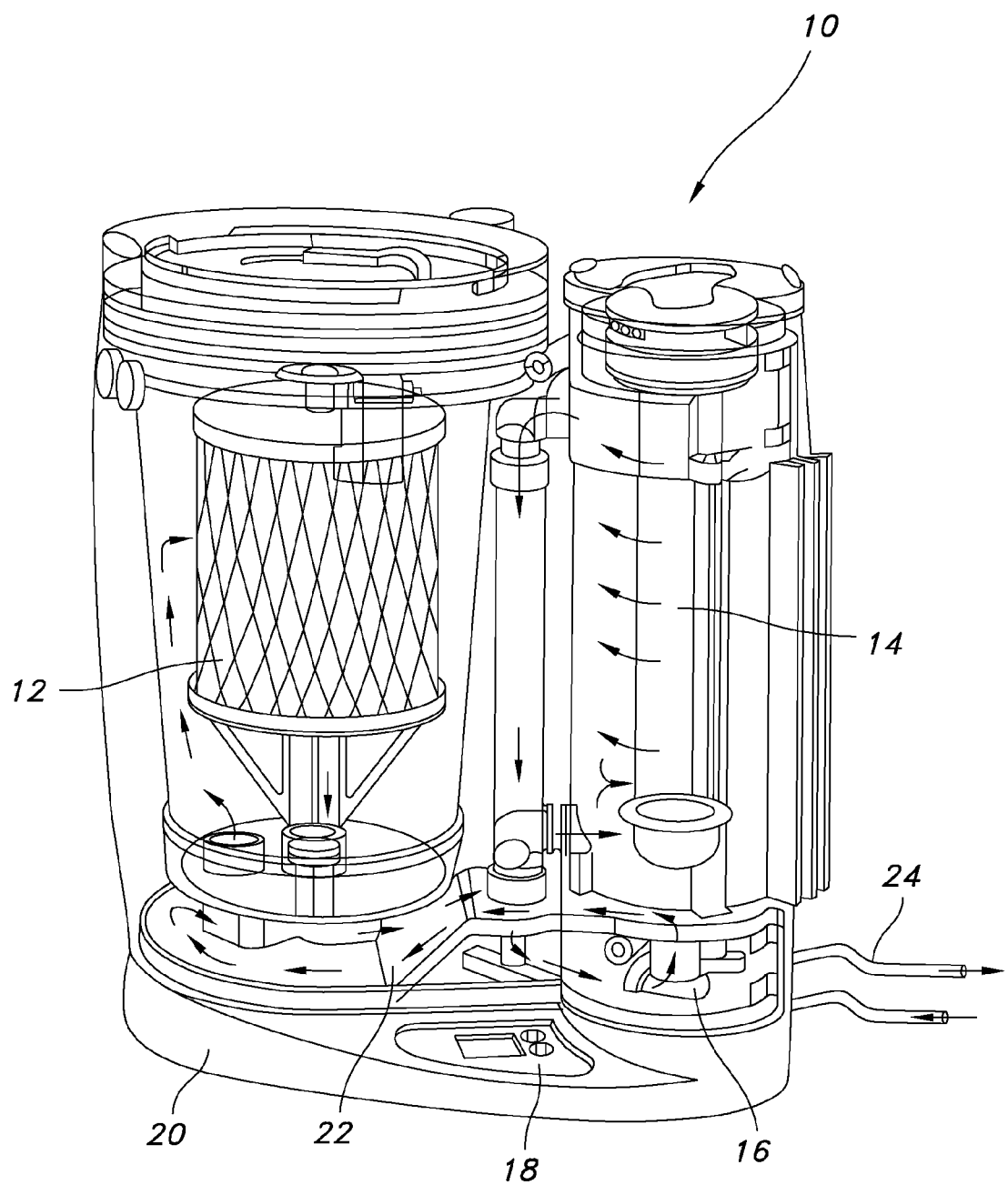
FIG. 1 is a fragmentary skeletal perspective view of the water treatment system.

A water treatment system (WTS) constructed in accordance with a preferred embodiment of the invention is illustrated in the drawings and designated 10. The WTS includes an ultraviolet (UV) subsystem 14 to destroy microorganisms in water flowing through the WTS. The WTS further includes a moisture detection or sensing device 102 on the UV lamp to detect the presence of moisture in a location that is inappropriately close to the lamp. The UV lamp control circuit 120 is responsive to the device 102, and therefore the presence of moisture, to cause action such as termination of power to the UV lamp or indication to the system user of the inappropriate condition.

With the exception of the moisture detector and the control circuit to be described, the WTS 10 is generally well known to those of ordinary skill in the art. In the current embodiment, the WTS 10 is generally as disclosed in U.S. Pat. No. 7,166,216 (noted above), and the disclosure of that patent is specifically incorporated herein.

As illustrated in FIG. 1, the WTS unit 10 generally includes a filter subsystem 12, a UV subsystem 14, a water pipe assembly 16, a display 18, a base assembly 20, a manifold assembly 22, and hoses 24 for conveying water into and out of the WTS 10. The arrows indicate the flow of water through the system, including the rotary flow through the UV subsystem 14.

Figure 2:
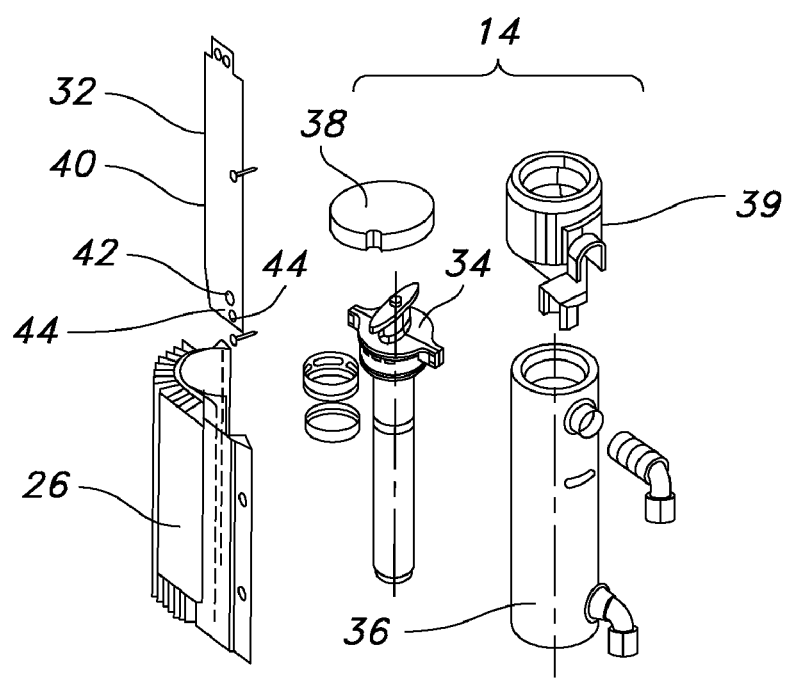
FIG. 2 is an exploded perspective view of the ultraviolet subassembly and related components.
Figure 4:
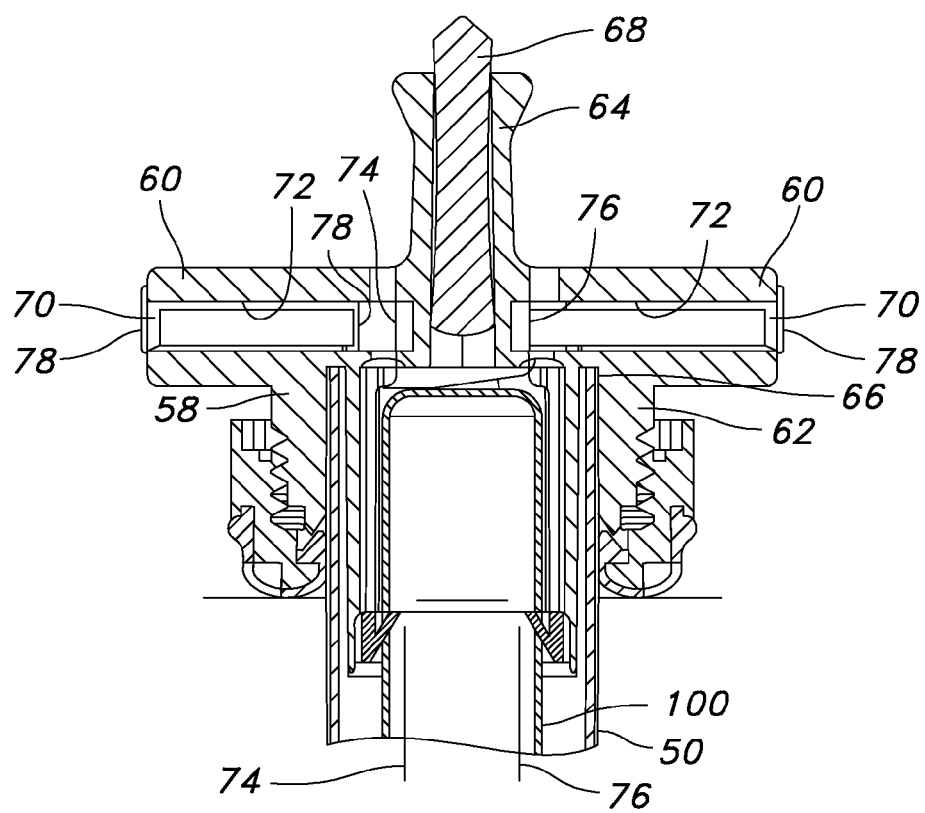
FIG. 4 is an enlarged fragmentary section view of the area within line 4E in FIG. 3D.
Figure 5:
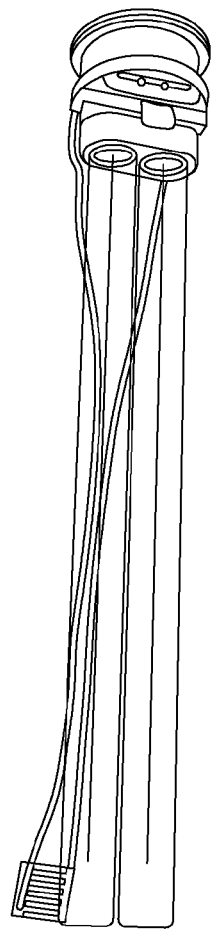
FIG. 5 is a perspective view of the lamp including the moisture detection device.
Figure 6:
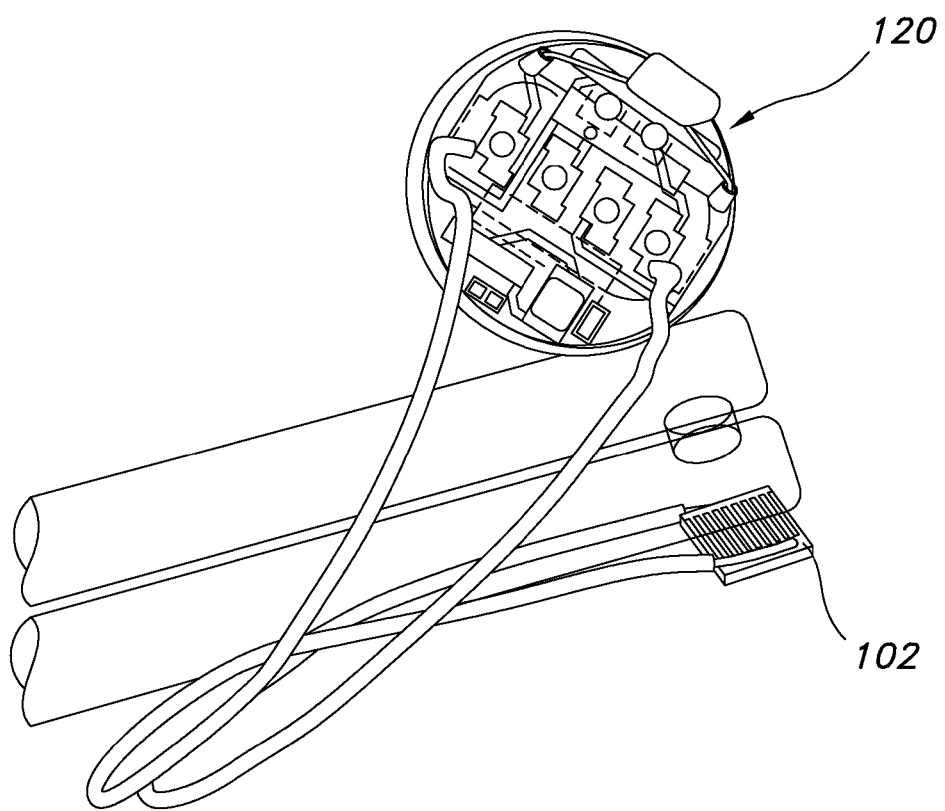
FIG. 6 is a fragmentary perspective view of the lower end of the lamp, the moisture detection device, and the lamp cap.

The UV subsystem 14 and related components are shown in FIG. 2. The components include a support plate 26, a PC board 32, a UV lamp assembly 34, a UV tank (or light source chamber or water chamber) 36, a bulb cover 38, and a cap assembly 39.

The PC board 32 includes a circuit board 40 upon which electronic components and circuitry are mounted. A female plug 42 is located near the base of the circuit board 40 for receiving power from a male pin (not shown). A pair of contacts 44 are located near the base of circuit board 40 and are used to communicate with display 18 (see FIG. 1) regarding the status of the UV lamp (i.e. whether the lamp is lit).

The UV lamp assembly 34 is illustrated in FIGS. 3A-D and 4. The lamp assembly 34 includes a quartz sleeve 50 and a bulb assembly 56 received therein. A bumper O-ring 52 spaces the lower end of the bulb assembly 56 from the sleeve 50, and a compression nut 54 threadedly receives the upper end of the bulb assembly. As best seen in FIG. 3A, the bulb assembly 56 has a molded body 58 including a pair of radially extending flanges 60, an annular hub 62, and a knob 64. An annular slot 66 (see FIG. 4) in the hub 62 receives the upper open end of the quartz sleeve 50. A light pipe 68 is press-fit within an opening in the knob 64 and is exposed to the UV bulb 100.

Electrical terminals 70 (FIG. 4) are disposed within radially extending slots 72 in the flanges 60. The terminals 70 are electrically connected to the UV bulb 100 to provide power to the filaments 74 and 76. Access slots 78 provide access during manufacture of the bulb assembly so that the filaments 74 and 76 can be soldered to the terminals 70. Detector wires 104 and 106 (FIGS. 3D and 5-8) also are connected to the terminals 70. The exposed radial ends of the terminals 70 electrically connect to a power circuit (not shown) when the UV lamp assembly 56 is mounted within the sleeve 50.

A moisture sensing or detecting device or element 102 is attached, for example using adhesive or tape, to the lower end of the UV lamp 100. The device 102 is illustrated in detail in FIG. 8. The wires 104 and 106 are connected at 112 and 114 respectively on a nonconductive substrate 110. Extending from wire connection 112 is a first printed serpentine pathway or trace 116 of copper or other conductive material, and extending from wire connection 114 is a second printed pathway or trace 118 of copper or other conductive material. The two pathways are configured to be in spaced relationship along their entire lengths.

When moisture is not present on the device 102 (FIG. 8), no current flows between the two pathways 116 and 118, and the element 102 is nonconductive. However, when moisture accumulates on the device 102, the moisture provides a conductive connection or path between the printed pathway 116 and the printed pathway 118. This allows current to flow across moisture sensing circuit 102, and the device is conductive. So, the device 102 has relatively high impedance when dry and relatively low impedance when wet.

Figure 7:
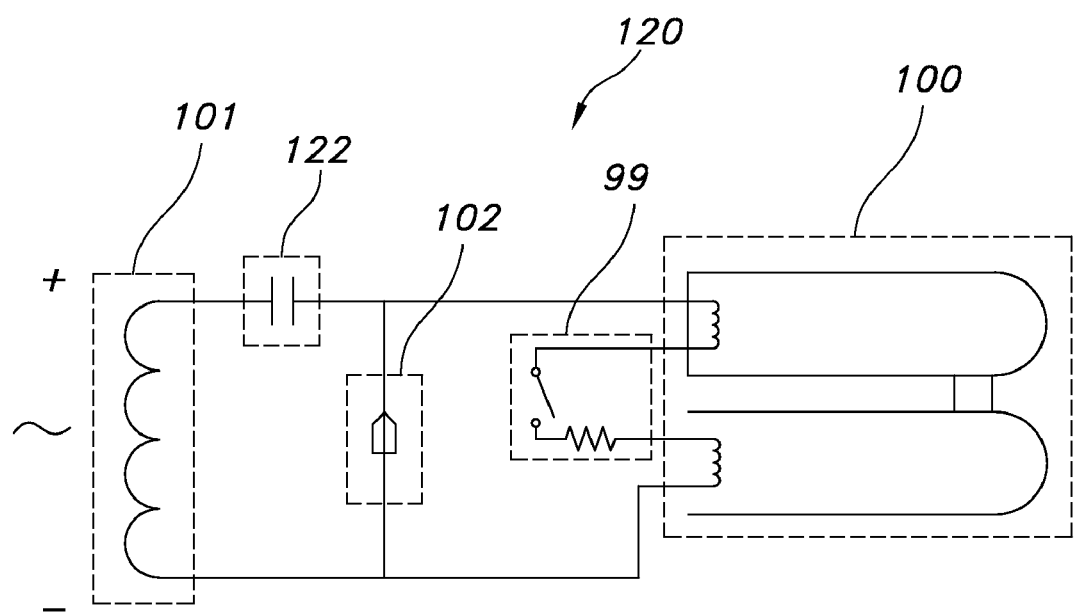
FIG. 7 is a schematic circuit diagram of the lamp power circuit.
Figure 8:
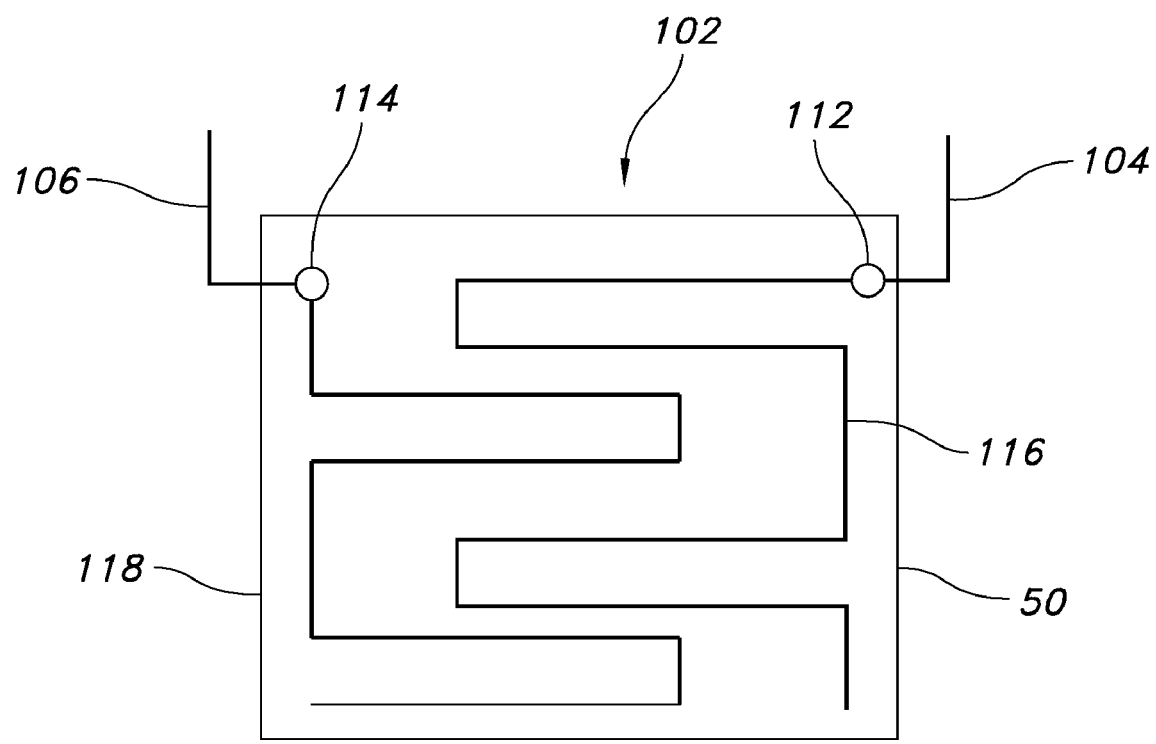
FIG. 8 is a schematic circuit diagram of the moisture sensing device.

The power circuit 120 into which the device 102 is incorporated is illustrated in FIG. 7. The circuit 120 includes a secondary 101 inductively coupled to a primary (not shown) to provide alternating current (AC) power to the bulb 100 through a capacitor 122. A conventional pre-heat circuit 99 is in series between the two bulb filaments 74 and 76.

The power circuit 120 (FIG. 7) operates "normally" when no moisture is present. The device 102 (in the absence of moisture) is nonconductive, and all current within the circuit 120 flows through the UV lamp 100 and the pre-heat circuit 99 when it is activated. If moisture is present on the device 102, and more specifically on the substrate 110 and both pathways 116 and 118, the device becomes conductive with relatively low resistance. Moisture should not be present on the device 102, because that would indicate that moisture is within the sleeve 50, which would indicate a sleeve breakage, a seal failure, or some other undesirable condition. At this point, all current within the circuit 120 flows through the device 102 rather than the higher resistance UV bulb 100. Consequently, power is terminated to the UV bulb 100, and the bulb is not illuminated. An appropriate indication preferably is displayed on the display 18 (see FIG. 1) to let the system user know that the system is not operating as desired. For example, one of the visual indicators in the display 18 could be responsive to a UV light detector (not shown) monitoring the UV output of the bulb 100.

Although the present invention is disclosed and described in conjunction with a consumer water treatment system, the invention has applicability well beyond such a system. Specifically, the invention can be used in virtually any lighting environment where it is necessary or desirable to monitor for the presence of water or moisture.

The above description is that of the current embodiment of the invention. Various alterations and changes can be made without departing from the spirit and broader aspects of the invention as defined in the claims, which are to be interpreted in accordance with the principles of patent law including the doctrine of equivalents.

The invention claimed is:

1. A water treatment system comprising:
a light source chamber;
a light source within the chamber, the light source having a resistance;
a moisture-detecting device within the chamber, the device electrically connected in parallel with the light source and having a first resistance greater than the resistance of the light source when a preselected level of moisture is not present, the device having a second resistance less than the resistance of the light source when the preselected level of moisture is present; and
a control circuit operatively connected to the light source and to the moisture-detecting device, wherein the moisture-detecting device provides a relatively low resistance pathway preventing the light source from receiving power when the preselected level of moisture is present.

2. A water treatment system as defined in claim 1 wherein the light source is an ultraviolet (UV) light source.

3. A water treatment system as defined in claim 1 wherein the light source chamber includes a transparent portion.

4. A water treatment system as defined in claim 1 further comprising means for indicating that the control circuit is preventing the light source from receiving power.

5. A light source assembly comprising:
a chamber wall defining a light chamber;
a light source within the chamber, the light source having a resistance;
power means for powering the light source;
control means for controlling the power means, the control means including a moisture detector within the light chamber, the moisture detector electrically connected in parallel with the light source and having a first resistance greater than the resistance of the light source when moisture is not present within the chamber, the moisture detector having a second resistance less than the resistance of the light source when moisture is present within the chamber, wherein the moisture detector provides a relatively low resistance pathway when moisture is present to shunt current around the light source.

6. A light source assembly as defined in claim 5 wherein the light source is an ultraviolet (UV) light source.

7. A light source assembly as defined in claim 5 wherein the chamber wall includes a transparent portion.

8. A light source assembly as defined in claim 5 wherein the control means is responsive to the moisture detector to provide a visible indication when the moisture detector detects moisture within the light chamber.

9. A water treatment system comprising:
a water chamber through which water flows;
a light chamber normally water-free;
a light source within the chamber, the light source having a resistance; and
a detector means within the light chamber for detecting the presence of water, the detector means electrically connected in parallel with the light source and having a first resistance greater than the resistance of the light source when water is not present on the detector means, the detector means having a second resistance less than the resistance of the light source when moisture is present on the detector means,
the detector means providing a low resistance electrical path when water is detected within the light chamber to reduce current through the light source.

10. The water treatment system of claim 9 wherein the light chamber is defined at least in part by a quartz sleeve.

11. The water treatment system of claim 9 wherein the light source includes an ultraviolet (UV) lamp within the light chamber.

12. The water treatment system of claim 11 wherein the control circuit includes an optical sensor responsive to light emitted by the UV lamp.

13. The water treatment system of claim 9 wherein the system is a point-of-use water treatment system.

14. The water treatment system of claim 9 wherein the detector means comprises a nonconductive substrate and first and second electrically conductive pathways on the substrate.

15. A lighting assembly comprising:
   a chamber;
   a light source within the chamber, the light source having a resistance; and
   a water detector within the chamber, the water detector electrically connected in parallel with the light source and having a first resistance greater than the resistance of the light source when water is not present within the chamber, the water detector having a second resistance less than the resistance of the light source when water is present within the chamber,
   the water detector providing a conductive path when water is present within the chamber to reduce current to the light source.

16. The lighting assembly of claim 15 further comprising an optical sensor having an output indicative of the state of operation of the light source.

* * * * *